United States Patent [19]

Easterly

[11] Patent Number: 4,920,419
[45] Date of Patent: Apr. 24, 1990

[54] ZOOM LENS FOCUS CONTROL DEVICE FOR FILM VIDEO PLAYER

[75] Inventor: Robert W. Easterly, Churchville, N.Y.

[73] Assignee: Eastman Kodak Company, Rochester, N.Y.

[21] Appl. No.: 200,327

[22] Filed: May 31, 1988

[51] Int. Cl.$^5$ .............................................. G02B 7/11
[52] U.S. Cl. ..................................... 358/214; 358/225
[58] Field of Search ............ 358/214, 215, 216, 213.3, 358/225; 369/45; 354/145.1

[56] References Cited

U.S. PATENT DOCUMENTS

| | | | |
|---|---|---|---|
| 4,506,300 | 3/1985 | Fearnside | 358/214 |
| 4,642,700 | 2/1987 | Ohta et al. | 358/214 |
| 4,742,219 | 5/1988 | Ando | 369/45 |

Primary Examiner—Jin F. Ng
Assistant Examiner—Stephen Brinich
Attorney, Agent, or Firm—Francis H. Boos

[57] ABSTRACT

A device (10) controls the focus in a film video player (11) for projection of at least a portion of a film image (F) onto a sensor (16) that generates a corresponding video signal from the sensor image. The film video player (11) has a fixed focal length lens (15) and includes a zoom motor (25) and related elements for changing the magnification of the sensor image with respect to the film image, sensor motor (34) and related elements for adjusting the focus of the sensor image, and a microprocessor (40) and related elements for determining the necessary adjustment to and for controlling the sensor motor to maintain the focus of the sensor image at any selected magnification without cam surfaces. Device (10) determines actual lens focal length upon power-up, eliminating focus variances due to manufacturing and installation, and maintains apparent zoom rate constant throughout the selected range of magnifications.

13 Claims, 5 Drawing Sheets

ZOOM LENS FOCUS CONTROL DEVICE FOR FILM VIDEO PLAYER

TECHNICAL FIELD

The present invention relates generally to a film video player for generating a video signal from photographic film for display on a television monitor or receiver or for selective retention as by recording on a video recorder. More particularly, the present invention relates to the accurate control of the focus of a film video player having variable magnification.

BACKGROUND ART

Apparatus for sensing various types of photographic color films and for converting an image into a video signal are well known in the art. With the development of relatively low cost, reliable solid state image sensors there has been increasing interest in the development of film video players for displaying film images such as those present on color slides or color negatives on television monitors and receivers. With the availability of such sensors there has arisen an interest in composing a video image corresponding to only a portion of a film image and for displaying or recording such a video image.

A primary reason for the interest in composing selected video images constituting a portion of a film image is that the resolution of the commonly used photographic film formats is substantially greater than standard television resolution by factors of approximately four to ten times. As will be appreciated, the full available resolution of these film formats is not effectively used at normal magnification where the full frame image substantially fills the solid state image sensor so that the video image effectively just fills the display of the television monitor or receiver. The excess resolution available in these film formats can be advantageously utilized by providing a film video player with means such as zoom optics for selectively changing the magnification of the video image and thus the displayed image with respect to the film image. Since in its magnified form the video image and resultant display constitutes only a portion of the film frame image, such film video players also preferably effect relative vertical and horizontal translation between the film image and the video image. More advanced composing or editing functions can be carried out where it is possible to effect relative rotation between the film image and the video image.

A common approach in the design of film video players of this type contemplates the use of fixed apparatus for mounting a slide or film negative presenting a film image and a fixed sensor spaced a distance therefrom along the optical axis of the system. Interposed between the fixed film image and fixed sensor is a multi-group variable focal length lens wherein one of the lens elements is movable axially along the optical axis to vary the focal length of the lens and thus provide a zoom capability.

Multi-group variable focal length lenses of this type suffer the disadvantage that they are relatively expensive. Such multi-group variable focal length lenses normally require the driving of a plurality of substantially fixed, complex cam surfaces to effect the zoom functions, and more specifically, establish and maintain focus as magnification changes. The cam surfaces are necessarily chosen to meet normal conditions for a particular system and cannot readily be altered or adjusted to accommodate manufacturing or assembly variations in variables such as the focal length of a particular lens or the exact plane where a film image or a sensor is mounted or oriented in a particular film video player. Normally, attempts to eliminate variables of this nature which degrade the performance of a film video player can be accomplished only by expensive adjustment or customizing procedures which must be employed for each individual unit being manufactured. Thus, the production of film video players employing multi-group variable focal length lenses involves extreme expense in terms of both the cost of the components employed and the labor required for assembly and adjustment due to the necessity for an essentially customized installation.

In film video player devices where the photographic film presenting the film image is moved horizontally and vertically to effect scan of the film image relative to the optical axis, significant ancillary problems are encountered. Such movement of the film carrying the film image creates mechanical difficulties in effecting quick film change which is highly desirable or in some instances essential in equipment of this type. In particular, whether slides or film negatives are employed, a moving slide or film holder makes it difficult if not impossible under reasonable cost constraints to design mechanisms for rapid loading and unloading of slides, film strips or other film segments. At the very least the utilization of known, inexpensive and proven slide and film change equipment is obviated. Thus, it is highly advantageous in devices of this type that the photographic film be presented in a mounting assembly which remains stationary.

U.S. Pat. Application Ser. No. 143,661 for "Film Video PLayer Apparatus", filed Jan. 13, 1988, proposes a film video player employing a fixed focal length lens and a plurality of stationary film image planes. The disclosed system creates a selectively composed video signal from a photographic film image by moving the lens and sensor axially along the optical axis of the system, by translating the sensor in two perpendicular directions relative to the film frame image, and by rotating the sensor relative to the film frame image. The present invention is generally directed to a device for advantageously establishing and maintaining the focus in such a film video player, irrespective of the magnification and without the need for cam surfaces.

DISCLOSURE OF THE INVENTION

Therefore, an object of the present invention is to provide a device for controlling the focus of the video image in a film video player which is capable of generating a selectively composed video signal from a photographic film image by means of changing the magnification of the video image relative to the film frame image.

Another object of the present invention is to provide a device for controlling the focus of the video image in a film video player, as set forth above, in which the need for and presence of focus controlling cam surfaces is completely obviated.

Yet another object of the present invention is to provide a device for controlling the focus of the video image in a film video player, as set forth above, in which focus is established and maintained in such manner to compensate for manufacturing and installation variances in lens focal length and the precise planar location of the film, sensor and lens.

Still another object of the present invention is to provide a device for controlling the focus of the video image in a film video player, as set forth above, in which the rate of zoom appears to remain constant throughout the range of magnification of interest.

These and other objects and advantages of the present invention over existing prior art forms will become more apparent and fully understood from the following description in conjunction with the accompanying drawings.

In general, the present invention contemplates a device to control the focus in a film video player having a fixed focal length lens. The film video player projects at least a portion of a film image onto a sensor which generates a corresponding video signal from a sensor image. The device includes means for changing the magnification of the sensor image with respect to the film image, means for adjusting the focus of the sensor image, and means for determining the necessary adjustment to and for controlling the means for adjusting to maintain the focus of the sensor image at any selected magnification without cam surfaces.

BRIEF DESCRIPTION OF THE DRAWINGS

FIG. 4 is a flow chart illustrating an exemplary operational procedure for maintaining focus of the sensor image during lens zoom in.

FIG. 5 is a flow chart illustrating an exemplary operational procedure for maintaining focus of the sensor image during lens zoom out.

PREFERRED EMBODIMENT FOR CARRYING OUT THE INVENTION

Figure 1:
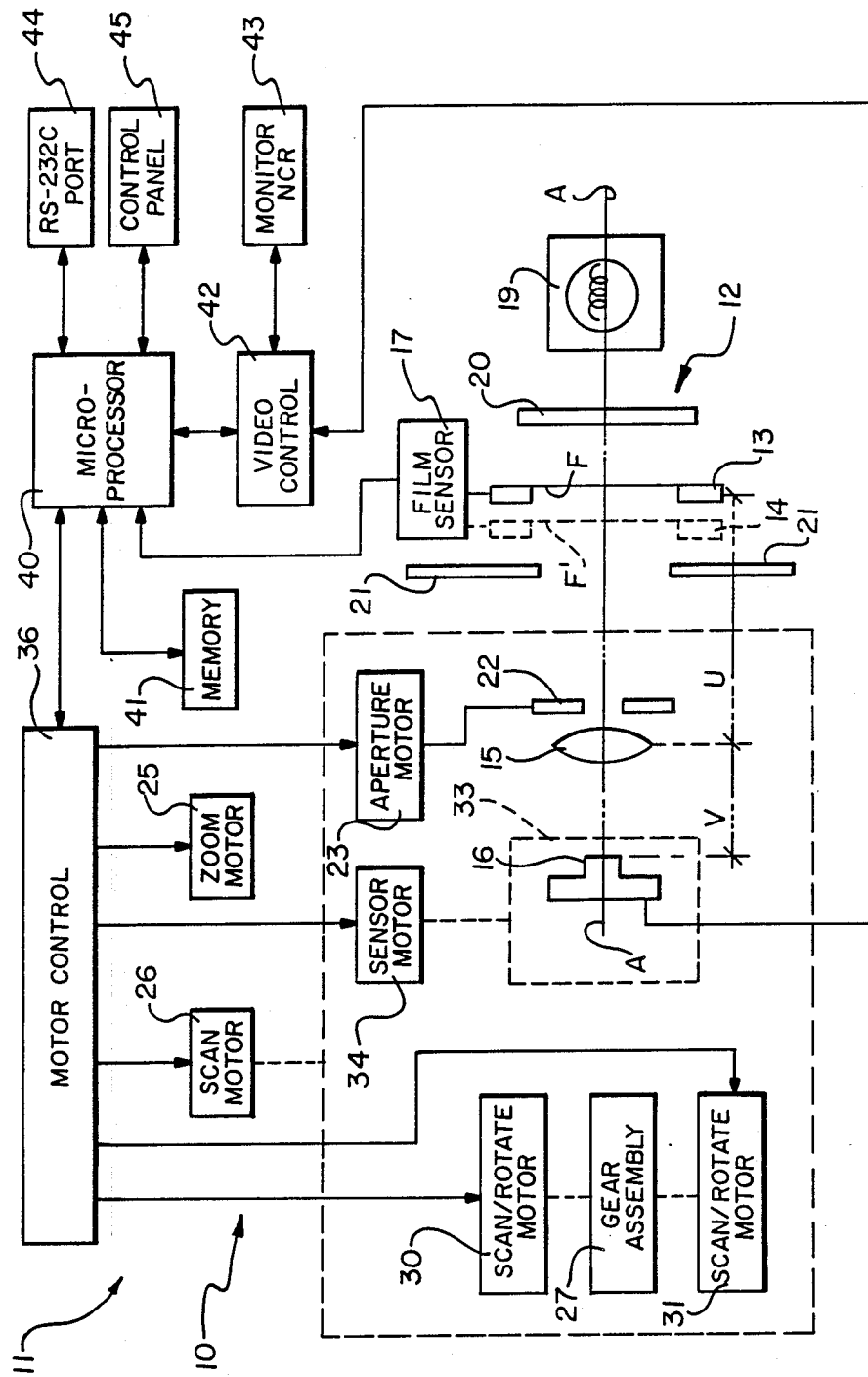
FIG. 1 is a block diagram of an exemplary device according to the concepts of the present invention, and includes a diagrammatic elevation of the salient elements of an exemplary film video player.

An exemplary zoom lens focus control device embodying the concepts of the present invention is indicated generally by the numeral 10 in FIG. 1 of the drawings. Zoom lens focus control 10 (focus control 10) controls the focus of a film video player, indicated generally by the numeral 11. Film video player 11 broadly includes an optical system, indicated generally by the numeral 12, two film gates 13 and 14, a fixed focal length lens 15 and a video image sensor 16.

Optical system 12 has elements and characteristics which are generally well known to persons skilled in the art. For exemplary purposes the optical system 12 is shown in FIG. 1 to include a light source lamp 19 which may be one of various types of high intensity lamps which provide a light source for illuminating a film gate.

As shown in FIG. 1, film gates 13 and 14 are illuminated by the lamp 19, and respectively mount photographic film F and F' therein which may carry a color image constituting the film image for the film video player system 11. The film gates 13, 14 may be suitably adapted to receive slides in one gate and film strips at a second gate. Alternately, it is to be appreciated that more or fewer gates could be provided for more or fewer types of photographic film. As a further alternative, various film formats might be presented at a single film gate. A film sensor 17, such as a conventional limit switch, may be provided to detect which film gate contains the image to be displayed.

Interposed between the lamp 19 and the film gates 13, 14 is a diffuser 20 which is adapted to improve the uniformity of the illumination from lamp 19 impinging upon the film gates 13, 14. The optical system 12 may also include a mask 21 which limits the size of the source image emanating from the film F and F' positioned in the film gates 13, 14. It will also be appreciated by persons skilled in the art that depending upon the type of light source employed, appropriate filters, choppers and attenuators may be employed to provide a light source having a range of intensities and uniformity sufficient to meet the desired operating characteristics of a particular film video player 11.

The elements of the optical system 12 are centered upon an optical axis A of the film video player 11. Fixed focal length lens 15 is also positioned on optical axis A at a variable distance from the film gates 13, 14. Interposed between the film gates 13, 14 and lens 15 is an aperture mechanism 22 which may be designed according to known parameters for conformance with operatively interrelated elements of film video player 11 and which may be opened and closed by a suitable aperture motor 23. Displaced to the other side of the lens 15 from the aperture mechanism 22 is the video image sensor 16 upon which the film image is directed by the lens 15. The video image sensor 16 may be a charge coupled device (CCD) of any various types which are well known in the art and which produce a video signal as an output. Known CCD image sensors produce from an impinging color image a color video signal which may equal or exceed standard television resolution. It will be appreciated by ordinarily skilled artisans that other types of video sensors may be employed depending upon particular applications for a film video player 11. The elements of the optical system 12, in addition to being centered upon optical axis A, are also stationary or fixedly mounted axially along the optical axis A.

The lens 15 and the sensor 16 are mounted in a manner to permit the independent motion of each axially along the optical axis A. In addition, the lens 15 and the sensor 16 are mounted to permit selective scan or translation in all directions and rotation in any plane perpendicular to the optical axis A within the limits of travel of the lens 15 and sensor 16 axially of the optical axis A.

The above general description of film video player 11 is for purposes of depicting a type of system with which the zoom lens focus control device of the present invention is operatively associated. Such a system possesses a fixed focal length lens and a sensor which moves axially, translationally in two directions, and rotationally in two directions with respect to its optical axis. The structural details and operative interrelationship of a film video player apparatus having these characteristics is disclosed in co-pending U.S. Application Ser. No. 143,661, for "Film Video Player Apparatus", filed Jan. 13, 1988.

As illustrated in exemplary fashion in that application, the lens 15 and the sensor 16 are jointly movable axially of the optical axis A, which may be referred to as the Z direction, by virtue of structural interrelationship with a carriage 24, the mechanical details of which are not relevant to the present invention. Carriage 24 may be driven in the Z direction by a zoom motor 25 which is preferably a stepper motor whose shaft can be rotated through a selected number of highly accurate angular increments. The angular motion of the shaft of zoom motor 25 may be translated in any suitable manner such as by a drive pulley to effect accurate linear travel of carriage 24 carrying lens 15 and sensor 16 along optical axis A.

Lens 15 and sensor 16 are also jointly translatable or scannable in one direction which may be referred to as the lateral, horizontal or X direction in an infinite number of planes perpendicular to optical axis A by virtue of structural interrelationship with carriage 24, the mechanical details of which are not relevant to the present invention. Carriage 24 may be driven in the X direction by a scan motor 26 which is preferably a stepper motor like that preferred for use as zoom motor 25.

Lens 15 and sensor 16 are jointly translatable or scannable in a direction perpendicular to the direction of movement of carriage 24, in this instance vertically or in the Y direction, and rotated in an infinite number of planes perpendicular to optical axis A by virtue of structural interrelationship with a gear assembly 27 or other suitable mechanism, the mechanical details of which are not relevant to the present invention. Scanning in the Y direction and rotation may be accomplished by the selective operation of scan/rotate motor 30 and scan/rotate motor 31 acting upon gear assembly 27, as set forth more fully in the aforementioned U.S. Pat. Application Ser. No. 143,661.

Since, as will be further discussed below, sensor 16 is necessarily positioned at a different axial distance from lens 15 for every different zoom position of carriage 24 reflecting magnification of a film image, sensor 16 is carried by a sensor carriage 33 moveable axially to selectively vary the axial distance between sensor 16 and lens 15. Sensor carriage 33 may be driven axially by a sensor motor 34, which is preferably a stepper motor like that preferred for use as zoom motor 25.

Aperture motor 23, zoom motor 25, scan motor 26, scan/rotate motors 30 and 31, and sensor motor 34 all may be operated by conventional stepper motor control circuitry, indicated by the numeral 36. Motor control 36 generates suitable digital signals to actuate the desired stepping motor for the number of steps necessary to achieve the desired translation and velocity.

The operation of focus control 10 may be controlled by a conventional microprocessor 40 such as the Model 8031 8-bit microprocessor manufactured by Intel Corporation of Santa Clara, California. In communication with microprocessor 40 over conventional address and data buses and control lines may be memory 41 (including volatile memory and non-volatile program memory), a video display control 42 (receiving the output of sensor 16 and interfacing to a video monitor or recorder 43), an RS-232C serial communication port 44 (through which film video player 11 may be interconnected to a wide variety of devices, including by way of example a hard copy output device such as a photographic printer or another computer (not shown)), and an appropriate operator control panel 45 (to input commands to microprocessor 40).

In order to more fully appreciate the present invention, it is desirable to keep in mind the range of magnification over which film video player 11 is to operate and the well-known relationship between magnification, lens focal length and the distance separating image F, lens 15 and sensor 16.

The range of magnification may be determined from the dimensions of sensor 16 and largest film image that mask 21 will allow to be used in film video player 11. Merely by way of example, it shall be assumed that a suitable sensor 16 has the dimension 6.6 mm vertical by 8.8 mm horizontal. Where film video player 11 is intended to present slide film images up to 35 mm in size, mask 21 may be provided with a suitable corresponding cutout dimension of 23 mm vertical by 34.3 mm horizontal.

Since slide film images may be oriented both vertically and horizontally, the minimum magnification may be defined as the magnification that occurs when the vertical dimension of a vertically oriented image fills the vertical dimension of the sensor. Since magnification is the ratio of the size of the image to the size of the object, in this instance the minimum magnification would be 6.6 mm/34.3 mm or 0.1924.

It is known that magnifying a conventional 35 mm slide image more than about five or six times nominal (i.e., 1X) magnification may result in unacceptable image degradation due to the grain of the slide image. Thus, the maximum magnification may be found by multiplying the nominal magnification by about five. Nominal magnification may be chosen to occur where the vertical dimension of a horizontally oriented image fills the vertical dimension of the sensor. In this instance the nominal magnification would be 6.6 mm/23 mm or 0.2870, and the maximum magnification would be about five times that or 1.4348.

The relationship between magnification, lens focal length for a lens of finite thickness, and the distances separating image lens 15 and sensor 16, is well known to be expressed by the following two Equations:

$$U = f(1/M + 1) - f + f_{FRONT} \qquad \text{EQ. 1}$$
$$V = f(M + 1) - f + f_{BACK} \qquad \text{EQ. 2}$$

where $f_{FRONT}$, $f_{BACK}$ and f are the lens 15 front, back and nominal focal lengths, respectively, M is the true optional magnification, and U and V are the conjugate distances from image F to lens 15 and lens 15 to sensor 16, respectively. Since the lens focal lengths are fixed, repositioning the lens 15 and sensor 16 from a first conjugate location $U_1$, $V_1$ to a second conjugate location $U_2$, $V_2$ will result in a shift in the conjugate positions that may be expressed as follows:

$$U_1 - U_2 = f(1/M_1 - 1/M_2) \qquad \text{EQ. 3}$$
$$V_1 - V_2 = f(M_1 - M_2) \qquad \text{EQ. 4}$$

Solving for f it is seen that $$f = (U_1 - U_2)/(1/M_1 - 1/M_2) = (V_1 - V_2)/(M_1 - M_2) \qquad \text{EQ. 5}$$

It should now be appreciated that since the focal length f is fixed and the range of magnification known, incremental shifts in conjugate distances U and V may be calculated throughout the magnification range with as fine a resolution (i.e., discrete interval between separate magnifications) as described. Focus control 10 generates a table as further detailed hereinafter that correlates conjugate intervals with magnification intervals (the "conjugate table"), permitting film video player 11 to maintain focus as the lens 15 is zoomed relative to image F without the need or presence of any cam surface.

In the exemplary film video player 11 discussed herein and detailed in the aforementioned patent application, the stepper motors selected for use as zoom motor 25 and sensor motor 34 may be a conventional 1.8 degree step angle hybrid stepping motor or other drive of acceptable size, step accuracy and precision, and cost. These stepper motors may be configured to operate with 4000 conjugate intervals over the range of magnification of interest, or whatever other number of intervals will furnish an acceptable balance between zoom speed and smooth zoom appearance. While an increase in the number of steps will result in a smoother zoom appearance, it will also increase the time necessary for microprocessor 40 to process the required data, and, consequently, increase zoom time.

Before discussing generation of the conjugate table, it should be noted that if each of the 4000 conjugate intervals contained data for incrementing focus with the same absolute magnification increment, zooming would appear to the user of film video player 11 to change dramatically over the range of magnification. For example, if the magnification range was 1X to 4X and there were 4000 conjugate intervals, each conjugate interval would alter magnification by 0.001X. At a 1X magnification this would result in an absolute change of magnification of 0.001X divided by 1X or 0.1%. However, at 4X magnification the absolute change of magnification would be 0.001X divided by 4X or 0.025%. Such a change of apparent zoom rate is disconcerting to most users.

In order to insure that the zoom rate apparent to the user of film video player 11 remains constant throughout the magnification range, I have recognized that the rate of change of magnification may be made an exponential function of the zoom position. This means that when the conjugate table is generated the magnitude of the conjugate distance intervals stored in each of the 4000 intervals shall change exponentially so that scanning through the conjugate table at a constant rate will likewise produce a zoom rate that appears to remain constant.

The necessary adjustment to the conjugate distance intervals in the conjugate table is found by applying the range of magnification to the following equation:

$$M = X \exp(Y \times N) \quad \text{EQ. 6}$$

where M is again the true optical magnification, X and Y are constants and N equals the number of stepper motor steps, here 4000. In the present example when N=0, M=0.1924 (the minimum magnification), and when N=4000, M=1.4348 (the maximum magnification). Substituting these values into Equation 6 and solving simultaneously yields the following:

$$M = 0.1926 \exp(5.02 \times 10^{-4} \times N) \quad \text{EQ. 7}$$

Figure 2:
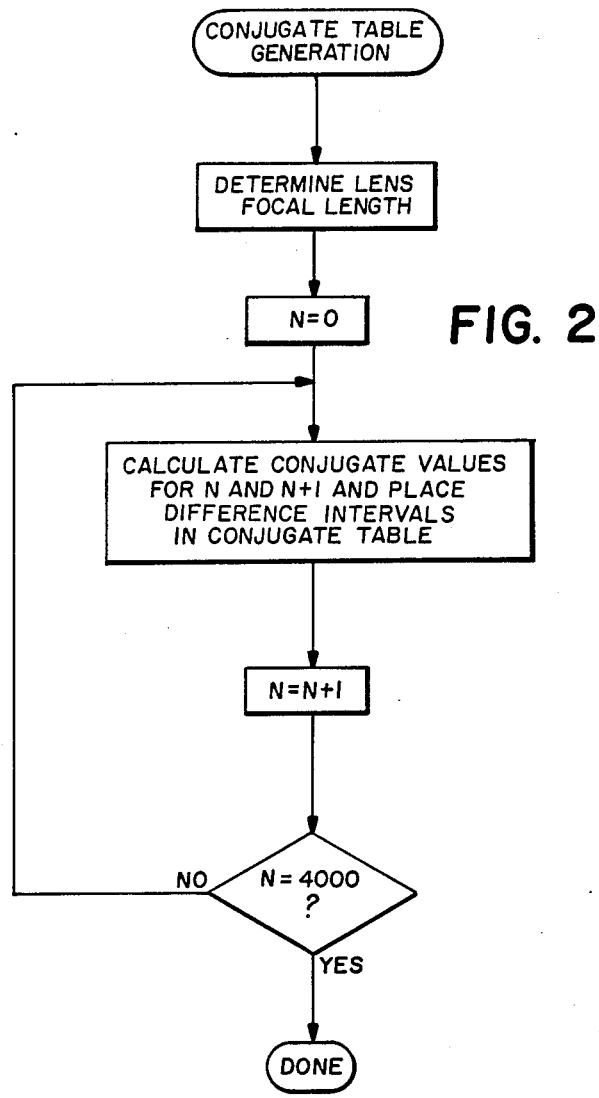
FIG. 2 is a flow chart depicting an exemplary operation procedure for generating the database for controlling the focus of film video player as magnification is varied.
Figure 3:
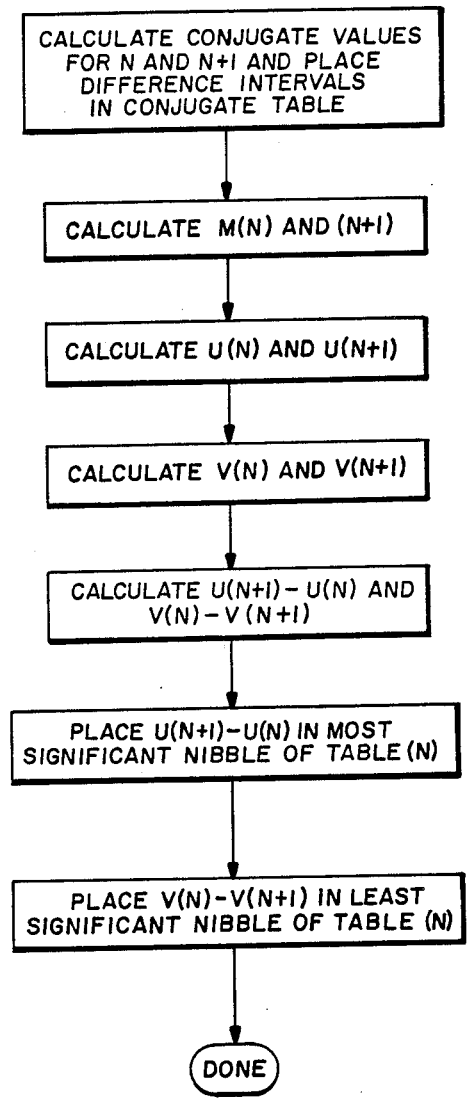
FIG. 3 is a flow chart showing in more detail the portion of the flow chart depicted in FIG. 2 pertaining to conjugate value calculation.

FIG. 2 is a flow chart of those steps performed by focus control 10, and in particular microprocessor 40, to generate the conjugate table. First the actual lens focal length is determined in a manner explained below. Next the index counter is set to zero and the conjugate values U and V calculated from Equations 7 and 5 for the minimum magnification N(0) and the next index value N(1), and their difference intervals placed in the conjugate table in memory 41 as shown more fully in the flow chart of FIG. 3. Thereafter the index is incremented by one and tested to see if the maximum index value is exceeded. If not, the conjugates are calculated for the next two magnification increments (presently N(1) and N(2)), and the process continued until after the preselected maximum index value is reached.

When completed, the conjugate table has the following form:

TABLE 1

| | Conjugate Table | |
|---|---|---|
| Index Value | ΔU | ΔV |
| 0 | U(1) − U(0) | V(0) − V(1) |
| . | . | . |
| . | . | . |
| . | . | . |
| N − 1 | U(N) − U(N − 1) | V(N − 1) − V(N) |
| N | U(N + 1) − U(N) | V(N) − V(N + 1) |
| N + 1 | U(N + 2) − U(N + 1) | V(N + 1) − V(N + 2) |
| . | . | . |
| . | . | . |
| 4000 | U(4001) − U(4000) | V(4000) − V(4001) |

Figures 4, 5:
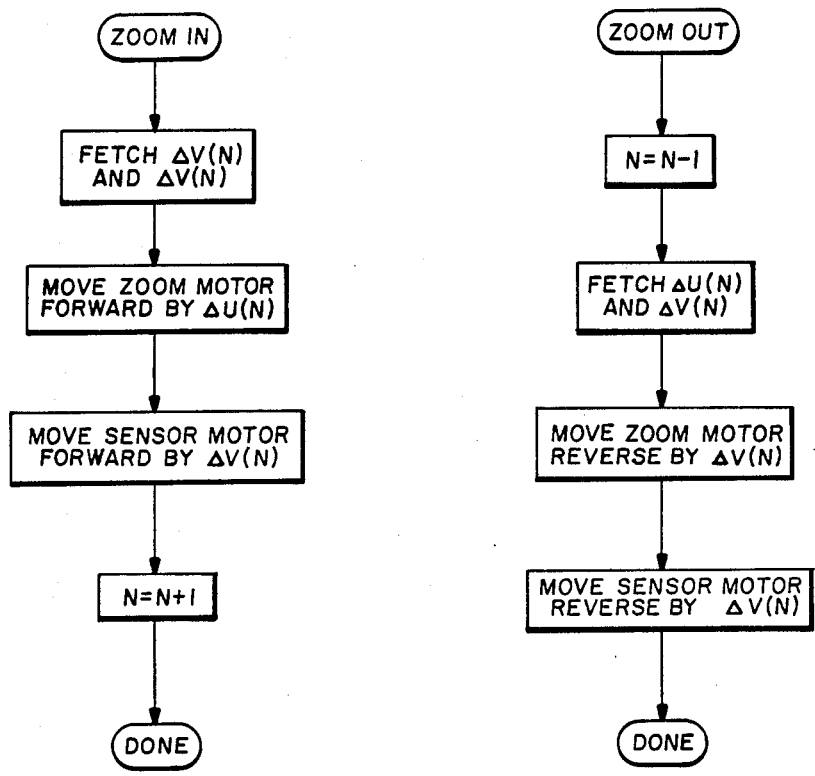

The flow charts presented in FIGS. 4 and 5 respectively depict the straightforward procedure employed by focus control 10 under the control of microprocessor 40 to maintain focus of the sensor image when lens 15 is being zoomed in and zoomed out. When zooming in, microprocessor 40 retrieves from the conjugate table conjugate interval data for the index value N that has been requested, actuates zoom motor 25 and sensor motor 34 accordingly, and increments the index value. A similar process is executed when zooming out, except that the index value is decremented first and, of course, zoom motor 25 and sensor motor 43 are actuated in the opposite or reverse direction.

Figure 6:
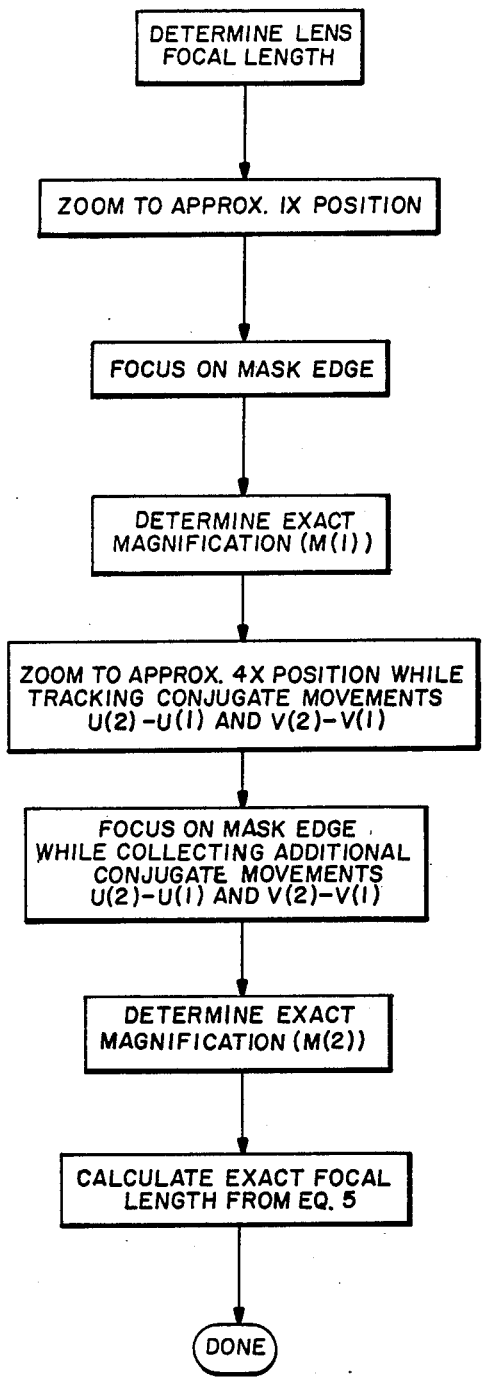
FIG. 6 is a flow chart showing an exemplary operational procedure for determining the actual lens focal length.

Focus control 10 generates a conjugate table each and every time film video player 11 is powered up. As noted above this includes determining the actual lens focal length. FIG. 6 presents a flow chart for determining lens focal length.

The first step in this operation is to zoom to a position that yields approximately a 1X or nominal magnification. The conjugates for such an approximate position may be calculated from Equations 1 and 2 and the manufacturer's focal length data for lens 15. Next, the exact magnification for that location along optical axis A (which may be called M(1)) may be determined.

Figure 7:
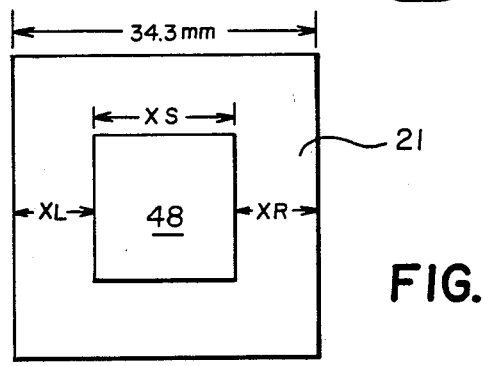
FIG. 7 is an elevation showing the location of the sensor image relative to the mask cutout when the sensor is at the approximate 1X magnification position.

One suitable manner by which the exact magnification may be determined may be best understood by reference to FIG. 7 which depicts the sensor image 48 at the approximate 1X magnification position within the cutout area of mask 21. Since both the cutout dimensions and sensor 18 dimensions are known, the image size may be easily measured by scanning in the x direction and the exact magnification calculated from the following equation:

$$M = \text{Object size/Image size} = 8.8 \text{ mm}/(34.3 \text{ mm} - XL - XR) \quad \text{EQ. 8}$$

where M is the exact magnification; XS (shown in FIG. 7) is the horizontal or x direction dimension of the sensor image 48; XL and XR are the x direction distances between the left and right edges of sensor image 48, respectively, and the cutout in mask 21; and 8.8 mm and 34.3 mm are the exemplary horizontal dimensions noted above for sensor 16 and the cutout in mask 21, respectively.

Returning to FIG. 6 and the determination of lens focal length, lens 15 may be zoomed to a position that yields approximately the .4X magnification, and the exact magnification (which may be called M(2)) found in a fashion similar to that explained above. By tracking and collecting conjugate positional information from the location at which the exact magnification M(1) was determined, there is now sufficient information to accurately and precisely calculate the actual lens 15 focal length as it then exists. In this way the need to determine and account for variations in focal length, and variations in lens, sensor and image location at the time of manufacture become completely unnecessary. Moreover, since the actual focal length is determined each time film video player 11 is activated, similar variations occurring after manufacture are likewise taken into account.

The ordinarily skilled artisan will appreciate that the present invention will operate equally well whichever of the many possible film image holders actually contain the image to be converted into a video signal and whatever magnification is selected. Indeed in determining minimum magnification it may be desirable to the user to allow for the conventional overscan area in a raster type video monitor. It may also be desirable to utilize a square mask 21 to allow for film images oriented vertically or horizontally.

Thus it should be evident that the zoom lens focus control device disclosed herein carries out the various objects of the invention set forth hereinabove and otherwise constitutes an advantageous contribution to the art. As will be apparent to persons skilled in the art, modifications can be made to the preferred embodiment disclosed herein without departing from the spirit of the invention, the scope of the invention being limited solely by the scope of the attached claims.

I claim:

1. A device to control the focus in a film video player for projection of at least a portion of a film image carried by a film image mount onto a sensor which generates a corresponding video signal from a sensor image, the film video player having a fixed focal length lens located on an optical axis between said film image mount and said sensor to project said portion onto said sensor, said device comprising: means for moving said lens axially of said film image mount for selectively changing the magnification of the sensor image with respect to the film image; means for moving said sensor axially of said film image mount mechanically independently of movement of said lens by said lens moving means for adjusting the focus of the sensor image; and, means for determining the necessary adjustment and for controlling said means for adjusting to maintain the focus of the sensor image for changes in the selected magnification.

2. A device to control the focus in a film video player for projection of at least a portion of a film image onto a sensor which generates a corresponding video signal from a sensor image, the film video player having a fixed focal length lens, comprising: means for selectively changing the magnification of the sensor image with respect to the film image; means for adjusting the focus of the sensor image without cam surfaces; and, means for determining the necessary adjustment and for controlling said means for adjusting to maintain the focus of the sensor image for changes in the selected magnification; wherein said means for changing the magnification includes means for selectively varying the distance between the lens and film image, said means for adjusting the focus of the sensor image includes means for selectively varying the distance between the sensor and the lens, and said means for determining the necessary adjustment to and controlling said means for adjusting includes electronic circuit means for determining the conjugate distances between the lens and film image and between the sensor and the lens to maintain the focus of the sensor image at any selected magnification.

3. A device to control the focus in a film video player as set forth in claim 2, wherein said electronic means for determining the conjugate distances to maintain the focus comprises processor means.

4. A device to control the focus in a film video player as set forth in claim 3, wherein said means for changing the magnification of the sensor changes the magnification over a preselected range, and said processor means determines said conjugate distances at magnifications throughout said preselected range of magnification such that as magnification is changed the rate of change of magnification appears constant.

5. A device to control the focus in a film video player as set forth in claim 4, wherein said means for selectively varying the distance between the lens and film image includes a zoom stepper motor, said means for selectively varying the distance between the sensor and the lens includes a sensor stepper motor, and both said zoom stepper motor and said sensor stepper motor operate a preselected number of intervals over said preselected range of magnification.

6. A device to control the focus in a film video player as set forth in claim 5, wherein said processor means determines and stores the difference between conjugate distances at said intervals throughout said magnification range.

7. A device to control the focus in a film video player as set forth in claim 6, wherein said processor means further includes means for selectively retrieving from storage said conjugate distance differences and initiating operation of said zoom stepper motor and said sensor stepper motor to maintain focus while the lens zooms the film image.

8. A device to control the focus in a film video player as set forth in claim 7, wherein said processor means determines the actual lens focal length and maintains focus based thereon.

9. A device to control the focus in a film video player for projection of at least a portion of a film image carried by a film image mount onto a sensor which generates a corresponding video signal from a sensor image, the film video player having a fixed focal length lens located on an optical axis between said film image mount and said sensor to project said portion onto said sensor, said device comprising: means for simultaneously moving both said lens and said sensor axially of said film image mount for selectively changing the magnification of the sensor image with respect to the film image; means for simultaneously moving said sensor axially of both said film image mount and said lens for adjusting the focus of the sensor image; and, means for determining the necessary adjustment and for controlling said means for adjusting to maintain the focus of the sensor image for changes in the selected magnification, said means for determining the necessary adjustment and controlling said means for adjusting including processor means for maintaining the focus of the sensor image at any selected magnification so that as magnification is changed the rate of change of magnification appears constant.

10. A device to control the focus in a film video player for projection of at least a portion of a film image carried by a film image mount onto a sensor which generates a corresponding video signal from a sensor image, the film video player having a fixed focal length lens located on an optical axis between said film image mount and said sensor to project said portion onto said sensor, said device comprising: means for moving said lens and said sensor axially of said film image mount for selectively changing the magnification of the sensor image with respect to the film image; means for moving said sensor axially of said film image mount and said lens for adjusting the focus of the sensor image; and, means for determining the necessary adjustment and for controlling said means for adjusting relative to said means for changing to maintain the focus of the sensor image for changes in the selected magnification, said means for determining the necessary adjustment and controlling said means for adjusting including processor means for determining the actual lens focal length and maintaining the focus of the sensor image at any selected magnification based thereon.

11. A film video player for generating a video signal from a film image, comprising:
means for mounting a film for presenting a film image; a sensor for generating a video signal from a sensor image; a fixed focal length lens located on an optical axis between said mounting means and said sensor for projection of at least a portion of said film image onto said sensor to form said sensor image; means for moving said lens along said optical axis relative to said mounting means for selectively changing the magnification of the sensor image with respect to the film image; and means for moving said lens along said optical axis relative to said sensor for adjusting the focus of said sensor image without cam surfaces; and means for determining the necessary adjustment and for controlling said means for adjusting to maintain the focus of the sensor image for changes in the selected magnification.

12. A film video player as set forth in claim 11, wherein said means for changing the magnification includes means for selectively varying the distance between the lens and film image, and said means for adjusting the focus of the sensor image includes means for selectively varying the distance between the sensor and the lens.

13. A film video player as set forth in claim 12, wherein said means for determining the necessary adjustment and for controlling said means for adjusting includes processor means for determining the conjugate distances between the lens and film image and between the sensor and the lens to maintain the focus of the sensor image at any selected magnification.

* * * * *